US008850501B2

United States Patent
Petersson et al.

(10) Patent No.: US 8,850,501 B2
(45) Date of Patent: Sep. 30, 2014

(54) IP MEDIA STREAMING SERVICE DELIVERY (75) Inventors: Justus Petersson, Stockholm (SE); Robert Skog, Hässelby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 884 days.

(21) Appl. No.: 12/745,083

(22) PCT Filed: Dec. 7, 2007

(86) PCT No.: PCT/EP2007/063554
§ 371 (c)(1),
(2), (4) Date: Sep. 2, 2010

(87) PCT Pub. No.: WO2009/071132
PCT Pub. Date: Jun. 11, 2009

(65) Prior Publication Data
US 2011/0209188 A1 Aug. 25, 2011

(51) Int. Cl.
*H04N 7/173* (2011.01)
*H04N 21/61* (2011.01)
*H04L 29/06* (2006.01)
*H04N 21/4227* (2011.01)
*H04N 21/258* (2011.01)
*H04N 21/658* (2011.01)
*H04N 21/643* (2011.01)

(52) U.S. Cl.
CPC ............ *H04L 63/08* (2013.01); *H04N 21/6125* (2013.01); *H04L 65/4084* (2013.01); *H04N 7/17318* (2013.01); *H04N 21/4227* (2013.01); *H04N 21/25816* (2013.01); *H04N 21/6582* (2013.01); *H04L 65/1016* (2013.01); *H04N 21/64322* (2013.01); *H04N 21/6181* (2013.01)
USPC ............................................ 725/110; 725/86

(58) Field of Classification Search
None
See application file for complete search history.

(56) References Cited

U.S. PATENT DOCUMENTS

2002/0138846 A1 * 9/2002 Mizutani et al. ................. 725/93
2006/0189319 A1   8/2006 Houldsworth et al.

FOREIGN PATENT DOCUMENTS

| EP | 1499127 A1 | 1/2005 |
| JP | 2006526319 A | 11/2006 |
| WO | 03/056830 A1 | 7/2003 |
| WO | 2007089045 A1 | 8/2007 |
| WO | 2007/131548 A1 | 11/2007 |
| WO | 2008/028515 A1 | 3/2008 |

OTHER PUBLICATIONS

Haber, A. et al. "Remote Service Usage through SIP with Multimedia Access as a Use Case." The 18th Annual IEEE International Symposium on Personal, Indoor and Mobile Radio Communications (PIMRC'07), Sep. 1, 2007, pp. 1-5.
Cagenius, T. et al. "Evolving the TV Experience: Anytime, Anywhere, Any Device." Ericsson Review No. 3, Jan. 1, 2006, pp. 107-111.

* cited by examiner

*Primary Examiner* — Chenea Smith
(74) *Attorney, Agent, or Firm* — Coats & Bennett, PLLC (57) ABSTRACT

A method of ordering the delivery of a media stream to a client terminal coupled to an IP network is described. The method comprises identifying, at a user terminal (e.g. a mobile device), destination address information for the client terminal. The user terminal is authenticated to an application server of an IP Multimedia Subsystem network, and the destination address information is sent from the user terminal to the application server. The media stream is then sent to the client terminal. This enables the media to be delivered to the client terminal on the basis of the authentication of the user terminal.

24 Claims, 5 Drawing Sheets

IP MEDIA STREAMING SERVICE DELIVERY

TECHNICAL FIELD

The present invention relates to delivering an IP streaming service and is applicable in particular, though not necessarily, to delivering IP unicast media such as IPTV services.

BACKGROUND

IP television or IPTV is the name given to a range of services which allow television to be delivered over an IP network. Due to the flexible nature of an IP network, IPTV will allow for a much more personalised service to users, e.g. video-on-demand, with information delivered to users over unicast IP streams. However, to order and control these user specific services, the user would normally be expected to use his or her remote control whilst sitting in front of a Set-Top-Box (STB)/TV. Currently the predominant way of controlling these unicast streams is to use the real time streaming protocol (RTSP). RTSP does not specify a transport protocol but may be used, for example, to establish and control real-time transport protocol (RTP) media streams. RTSP is in many ways similar to the HTTP protocol used to request and exchange information over the web, but is tailored for streaming media such as audio and video. RTSP allows a client to request particular media streams from a streaming server, and specifies commands such as PLAY and PAUSE. RTSP is well suited to the conventional set-top-box use case.

It is expected that users of mobile terminals such as mobile telephones will wish to avail themselves of IPTV services. Indeed, this is probably key to the business models of network operators currently installing high capacity cellular networks such as 3G networks. Within cellular networks, IPTV is a service which will likely be facilitated by the so-called IP Multimedia Subsystem (IMS). IMS is the technology defined by the Third Generation Partnership Project (3GPP) to provide IP Multimedia services over mobile communication networks (3GPP TS 22.228, TS 23.218, TS 23.228, TS 24.228, TS 24.229, TS 29.228, TS 29.229, TS 29.328 and TS 29.329), although the IMS architecture is such that its services can be accessed and controlled via other interfaces, for example the fixed access network. IMS makes use of the Session Initiation Protocol (SIP) to set up and control calls or sessions between client terminals, or client terminals and application servers. The Session Description Protocol (SDP), carried by SIP signaling, is used to describe and negotiate the media components of the session. Whilst SIP was created as a user-to-user protocol, IMS allows operators and service providers to control user access to services and to charge users accordingly.

It will be appreciated that IMS and RTSP have traditionally been considered as alternative approaches for the establishment and control of unicast streaming sessions. Whilst IMS provides a mechanism for controlling QoS and charging, as well as transcoder negotiation, RTSP supports trickplay and basic video-oriented commands.

A number of systems are currently on the market which allow a user to control a STB remotely over the Internet. These include LocationFreeTV™ from Sony Corporation and Slingbox™ from Sling Media. Both of these systems allow a user to instruct the delivery of media from the home STB to a client terminal (e.g. a STB or a television in a hotel room in which a user is staying).

SUMMARY

Current commercially available systems such as Location-FreeTV and Slingbox are designed to allow a user of a remote terminal, for example an Internet connected device such as a mobile telephone, PDA, or laptop, to order the delivery of media from the home STB to the remote terminal. They are not designed to allow the user to order the delivery of media to some terminal other than the one currently being used, be it in the home or elsewhere. Even if this were possible, it would necessarily involve the routing of media through the home STB which would result in quality of service and scalability issues.

It is desirable, for example, to allow a user to make use of a mobile telephone to order the delivery of media to a terminal in the user's hotel room or other current location. It is further desirable for the user to order the delivery of media to a such a terminal even if it is not IMS enabled.

In accordance with one aspect of the present invention there is provided a method of ordering the delivery of a media stream to a second client terminal coupled to an IP network. The method comprises identifying, at a first client terminal, destination address information for the second client terminal. The first client terminal is authenticated to an application server of an IMS network, and the destination address information is sent from the first client terminal to the application server. The media stream is delivered to the second client terminal.

This means that the media stream can be delivered to the second client terminal on the basis of the authentication and/or authorisation of the first client terminal to the application server. The user of the first client terminal can pay for the media via his subscription. The second client terminal need not be IMS enabled (although it will be appreciated that the invention also applies to the situation where the second client terminal is IMS enabled).

The destination address information may include the IP address and port number of the second client terminal, and/or the IP address and port number of any gateway, such as a RGW, through which the second client terminal is coupled to the IP network.

The authentication of the first client terminal to the application server preferably includes an authentication of a user identity module (e.g. SIM/UICC card) associated with the first client terminal.

The authentication of the first client terminal to the application server may include a token identity handshake. In one embodiment, the authentication of the first client to the application server includes an authentication and/or authorisation of the second client terminal. Once the second client terminal has been authorised to the application server, then the second client terminal can request delivery of the media stream directly, but the authorisation will have come from the subscription of the first client terminal. Alternatively, the media stream may be delivered to the second client terminal in response to a RTSP service request sent from the first client terminal to the application server.

In one embodiment, a RTSP Uniform Resource Locator (URL) of the application server may be sent to the first client terminal, and this RTSP URL can then be passed on to the second client terminal. A session identity (generated by the application server) may be passed from the first client terminal to the second client terminal and used by the second client terminal to request delivery of the media stream. For example, the session identity may be identified by the first client terminal as a result of a RTSP SETUP procedure. This session identity may then be used by the second client terminal in a RTSP PLAY message sent towards the application server.

In a further alternative, if the second client terminal is IMS enabled, a SIP INVITE message may be sent from the application server to the second client terminal in response to a service request sent from the first client terminal to the application server.

The first client terminal may preferably be coupled to the IP WAN network via a cellular access network. The second client terminal may be coupled to the IP network via a fixed access network. In one embodiment, a reservation of resources for delivery of the media stream to the second client terminal over the fixed access network is initiated by an IMS message, preferably a SIP INVITE message including the destination address information, sent from the first client terminal towards the application server.

Preferably the first client terminal establishes communication with the second client terminal in order to identify the destination address information. This communication may be established using a local wireless network such as a WLAN or Bluetooth, although it will be appreciated that other means of communication (e.g. infra-red, cable) are also possible.

The media is preferably a unicast media such as IPTV, but it will be appreciated that other media may also be ordered. For example, media such as broadcast TV and games may also be provided.

In accordance with another aspect of the present invention there is provided an application server for use in an IMS to control the delivery of media to client terminals coupled to an IP network. The application server comprises a receiver for receiving, from a first client terminal in the IP Multimedia Subsystem, destination address information for a second client terminal coupled to the IP network. The application server also comprises authentication means for authenticating the first client terminal, and a processor and transmitter for arranging delivery of the media from a media source to the second client terminal. The media source may be any suitable media source, for example an nPVR, a video-on-demand server, etc.

In accordance with another aspect of the present invention there is provided a user terminal arranged in use to communicate with an application server of an IP Multimedia Subsystem. The user terminal comprises a receiver for receiving destination address information from a second client terminal, and a transmitter/processor/receiver for sending the destination address information to said application server, authenticating the user terminal to the application server, and instructing the application server to arrange delivery of media to the second client terminal. The user terminal preferably comprises an HTTP interface for communicating with the application server, and a wireless interface for communicating with the remote terminal.

In accordance with another aspect of the present invention there is provided a method of delivering a media stream to a client terminal. The method comprises authenticating a user terminal to an application server and sending address details of the client terminal from the user terminal to the application server.

DETAILED DESCRIPTION

A brief description of the architecture and operation of the IP Multimedia Subsystem (IMS) will aid in understanding embodiments of the present invention.

Call/Session Control Functions (CSCFs) operate as SIP proxies within the IMS. The 3GPP architecture defines three types of CSCFs: the Proxy CSCF (P-CSCF) which is the first point of contact within the IMS for a SIP client (typically residing in a client terminal); the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF.

A user registers with the IMS using the specified SIP REGISTER method. This is a mechanism for attaching to the IMS and announcing to the IMS the (IP) address at which a SIP user identity can be reached. The user receives a unique Uniform Resource Identifier (URI) from the S-CSCF to be used when it initiates a dialog. In 3GPP, when a SIP client performs a registration, the IMS authenticates the user (using the AKA procedure), and allocates an S-CSCF to that user from the set of available S-CSCFs. Whilst the criteria for allocating an S-CSCF is not specified by 3GPP, these may include load sharing and service requirements. It is noted that the allocation of an S-CSCF is key to controlling (and charging for) user access to IMS-based services.

During the registration process, it is the responsibility of the I-CSCF to select an S-CSCF if one is not already selected. The I-CSCF receives the required S-CSCF capabilities from the home network's Home Subscriber Server (HSS), and selects an appropriate S-CSCF based on the received capabilities. (It is noted that S-CSCF allocation is also carried out for a user by the I-CSCF in the case where the user is called by another party, and the user is not currently allocated an S-CSCF.) When a registered user subsequently sends a session request (e.g. a SIP INVITE) to the IMS, the request will include the P-CSCF and S-CSCF URIs so that the P-CSCF is able to forward the request to the selected S-CSCF. This applies both on the originating and terminating sides (of the IMS). (For a terminating call the request will include the P-CSCF address and the User Equipment (UE) address.)

Within the IMS service network, Application Servers (ASs) are provided for implementing IMS service functionality. ASs provide services to end-users in an IMS system, and may be connected either as end-points over the 3GPP defined Mr interface, or "linked in" by an S-CSCF over the 3GPP defined ISC interface. In the latter case, Initial Filter Criteria (IFCs) are used by the S-CSCF to determine which ASs should be "linked in" during a SIP Session establishment. Different IFCs may be applied to different call cases. The IFCs are received by the S-CSCF from an HSS during the IMS registration procedure as part of a user's User Profile (UP). Certain ASs will perform actions dependent upon subscriber identities (either the called or calling subscriber, whichever is "owned" by the network controlling the AS). For example, in the case of call forwarding, the appropriate (terminating) application server will determine the new terminating party to which a call to a given subscriber will be forwarded.

As well as having SIP interfaces (ISC or Mr), an AS can have one or more non-SIP interfaces. In particular, the Ut interface allows an AS to communicate directly with a client terminal using, for example, the RTSP or HTTP protocols.

Figure 1:
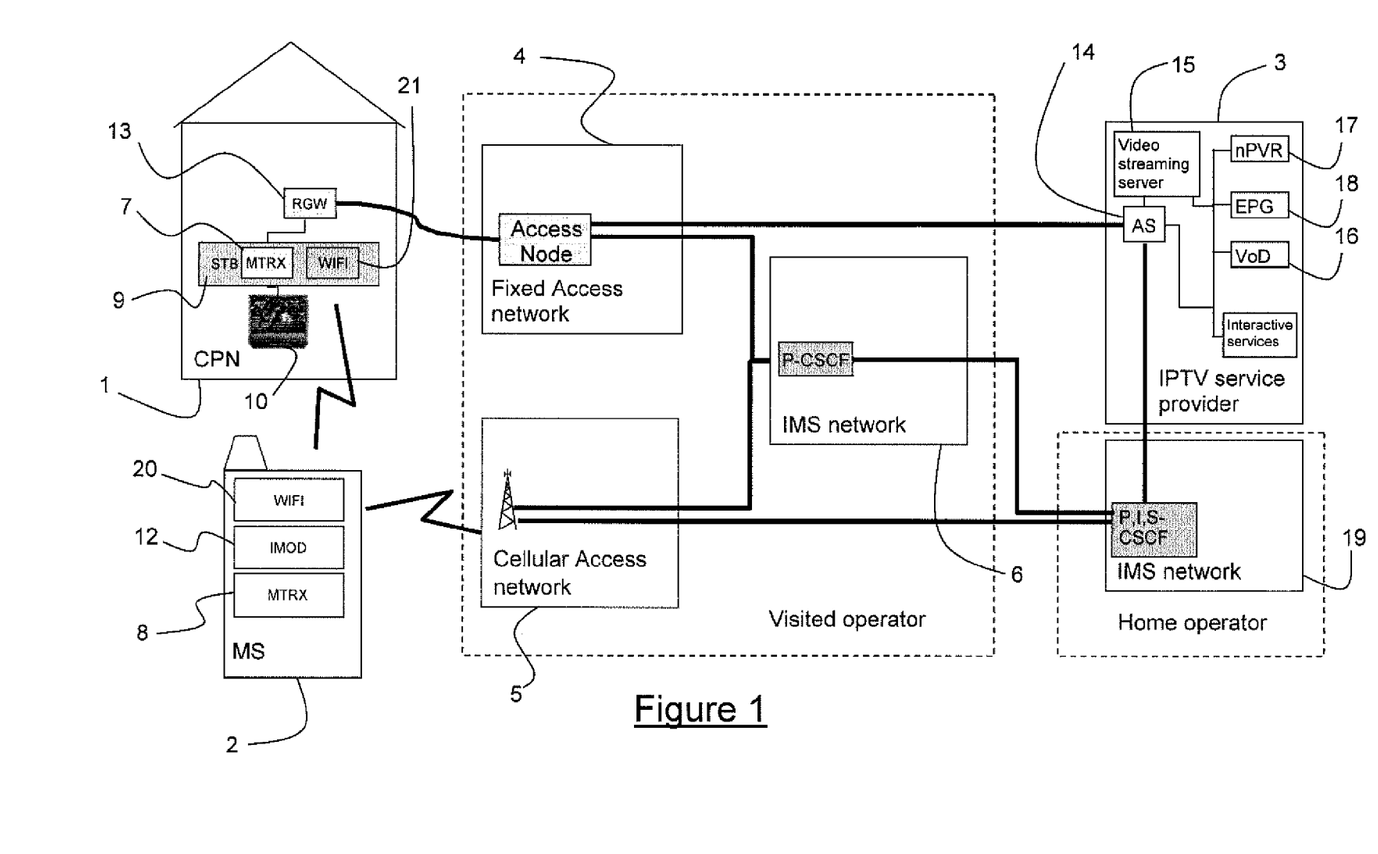
FIG. 1 illustrates schematically an IPTV topology architecture.

FIG. 1 presents an overview of the IPTV/IMS architecture illustrating the apparatus/functionality provisioned within a customer premises network (CPN) 1 (e.g. a home or a hotel room) and by a Mobile Station (MS) 2, which are attached respectively to a fixed access network 4 and a cellular access network 5 and visited operator IMS network 6. A TV 10 attached to a set top box (STB) 9 is located in the CPN 1. The STB 9 communicates with the fixed access network either directly or via a Residential Gateway (RGW) 13. A home operator provides an IPTV service provider 3 and home IMS network 19. Network elements of interest here are:

MTRX—Media Transmission/Reception Part 7,8; The "traditional" Set Top Box functionalities in an STB 9, for example reception of MPEG2 and/or MPEG4 streams and conversion of such streams for delivery to a TV 10. The MTRX 8 in the MS 2 should be IMS enabled. The MTRX 7 in the STB 9 need only be IP enabled.

IMOD—Identity and IMS Module 12; The part of an IMS enabled Set Top Box that contains the basic IMS service logic and the ISIM. The IMOD is implemented in the MS, enabling remote access to TV services.

WIFI—A wifi application 20, 21 (e.g. DLNA (Digital Living Network Alliance) or UPnP (Universal Plug and Play)) enables the MS 2 to communicate directly with the STB 9.

AS—Application Server 14; The function that interacts between the MS (and other IMS user devices) and the IPTV video servers. The AS also receives and processes HTTP and RTSP messages and sends media to the STB 9.

Video Streaming Server—the video streaming server 15. This is the source of unicast (streaming) media.

VoD—Video-on-demand (control) server 16. This server controls access to and playout from the distributed video unicast servers.

nPVR—network-based Personal Video Recorder 17. This server allows subscribers to store media, e.g. programmes, within the network. Playback is controlled via the IPTV AS.

EPG—Electronic Programme Guide 18. The EPG server stores details of currently available and upcoming media. A subscriber typically downloads the EPG via the IPTV MW AS and uses this to select or programme media delivery (available at the VoD/video unicast servers.

The MTRX entities will be present within STBs that are used to access the IPTV service. In addition, and as illustrated in the FIG. 1, the MTRX entity 8 and an IMOD 12 are present within the Mobile Station (MS) 2 or client terminal, which could for example be a cellular telephone. It will be appreciated that the MS may be present within an IMS network 6 of an operator that is not the operator of the IPTV service.

Figure 2:
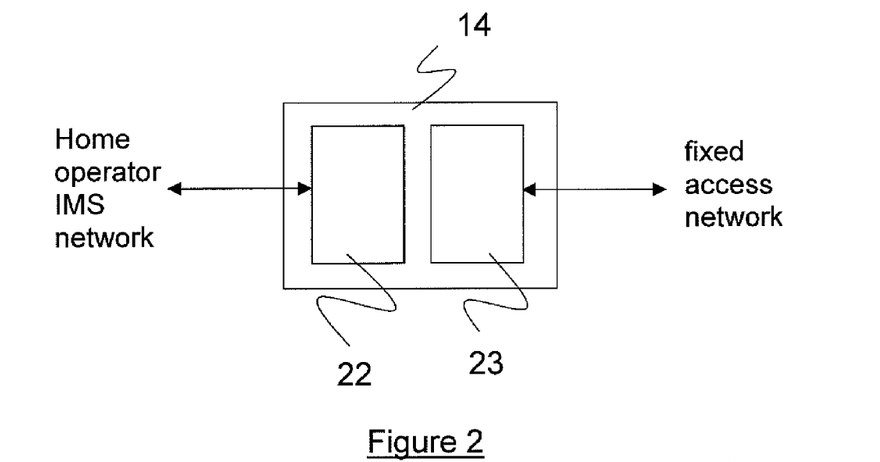
FIG. 2 illustrates schematically an IPTV AS of the network illustrated in FIG. 1.
Figure 3:
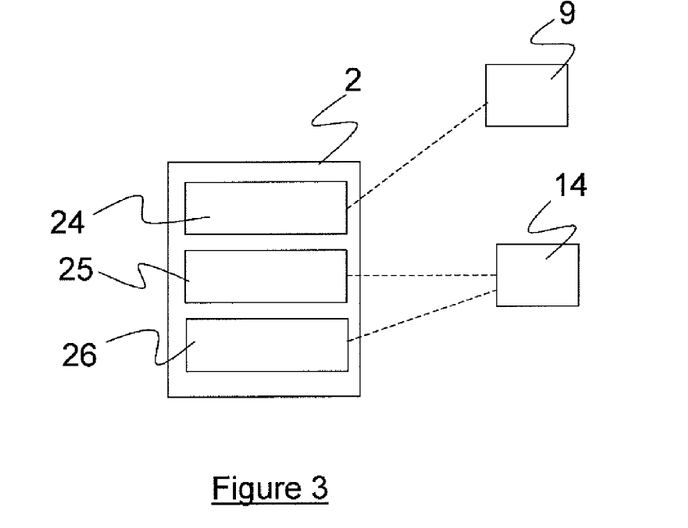
FIG. 3 illustrates schematically a mobile station of the network of FIG. 1.

FIG. 2 illustrates schematically the functional elements within the IPTV AS 14. These include a receiver 22 coupled to the Home operator IMS network 19 and a processor/transmitter 23 which can be coupled to the fixed access network 4. FIG. 3 illustrates schematically the functional elements within the MS 2, namely a transmitter/receiver 24 for communicating with the STB 9, a transmitter 25 for transmitting service requests to the IPTV AS, and a receiver 26 for receiving signaling information from the IPTV AS.

A process for allowing a user of the MS 2 to order the delivery of media to some third party terminal (STB) 9, located with the CPN 1, will now be described with reference to FIG. 4

Figure 4:
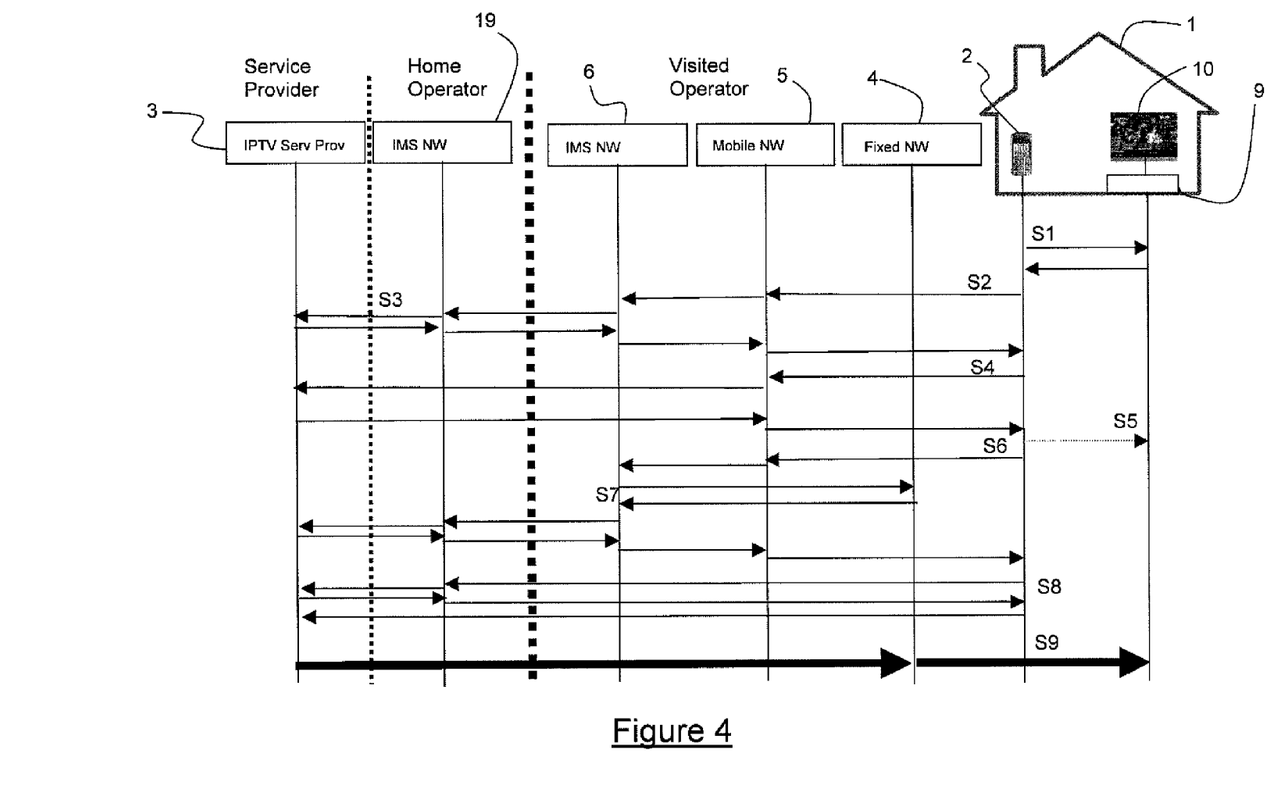
FIG. 4 illustrates a process for remotely ordering delivery of a media stream according to a first embodiment of the invention.

FIG. 4 illustrates a process flow according to a first embodiment of the invention. In step S1, the MS2 obtains the IP address, Port number and capability of the STB 9. This is typically carried out over a wireless connection, for example using DLNA or UPnP. However, any connection which enables the required exchange of information may be used. If the STB communicates the fixed access network via a RGW (not shown in FIG. 4), then the external IP address and port number of the RGW are also obtained by the MS 2.

In step S2, the MS 2 contacts its home IMS network 19 via the visited IMS network 6. The MS 2 is authenticated by the home IMS network 19 as having a subscription in that network, and authorised to make a purchase from the IPTV service provider 3. Step 2 is carried out using SIP signaling.

In step S3, the MS 2 is authenticated to the IPTV service provider 3. The IP address and port number of the STB 9 and/or RGW 13 may be provided to the IPTV service provider 3, so that they can be used as authentication/authorisation credentials by the STB later in the procedure. In a further alternative, the IPTV service provider 3 may generate and locally store a specific token identity. This token identity is later handed over from the MS to the STB to allow the STB to receive the requested service upon a service request message. As a result of steps 2 and 3, the MS 2 is able to arrange for the delivery of media from the IPTV service provider 3 to the STB 9, and this media can be paid for via the subscription of the MS 2 with his home IMS network 19.

In step S4, the MS 2 contacts the IPTV service provider (with whom it is now authenticated) via the visited mobile network 6 and requests details of the URL or source IP and Port number of the entity that will eventually provide the media. It may also request an EPG, which may be displayed to the user by the MS 2, or may be transferred (as shown in step S5) from the MS to the STB 9 to be displayed on the television 10. The MS 2 may also pass the IP address and Port number of the IPTV service provider to the STB 9 at this stage, together with the token identity referred to in step S3 (if obtained). Step S4 may be carried out using HTTP.

In step S6, once the user has selected the IPTV service that he would like to receive, the MS 2 contacts the IPTV service provider via the visited mobile network 5 to reserve necessary resources for delivery of the desired IPTV service. The MS 2 provides the external IP address and Port number of the STB 9 (and/or RGW 13) to the IPTV service provider 3 (if this has not already been done as part of the token exchange of step 3). Step 5 is carried out using SIP.

As part of this process, in step S7 a media plane set-up for the fixed-access network may be carried out. This may be triggered in the visited IMS network by the external IP address of the RGW 13 or the STB 9. The IMS network 16 recognises that the appropriate route for delivery of IP data to the RGW 13 is over the fixed access network 4, and the media plane is set up accordingly. Step S7 is carried out using SIP.

In one embodiment, step S6 is initiated by a SIP REQUEST message being sent from the MS 2 towards the home IMS network 19. The REQUEST message includes the external IP address of the RGW, and this is used by the visited IMS network 6 to reserve the required resources over the fixed network 4 in step S7.

In step S8, the MS 2 requests delivery of the IPTV service to the STB 9. This may be accomplished, for example, by a SIP INVITE message from the MS 2, which is mapped by the AS in the IPTV service provider's network to RTSP DESCRIBE and SET-UP messages before they are further relayed to the Video streaming server. An RTSP PLAY is then sent from the MS. The "sink" IP address and port number are those of the STB 9, either directly or via the RGW 13. Alternatively, the delivery of the IPTV service may be jointly requested by the MS2 and the STB 9. In this case, the SIP INVITE message is send from the MS 2 as just described, but the RTSP PLAY originates from the STB 9.

In step S9, the IPTV service is delivered from the IPTV service provider to the STB 9 over the fixed access network 4. The user will pay for the service as a result of his subscription to the home IMS network 19.

Figure 5:
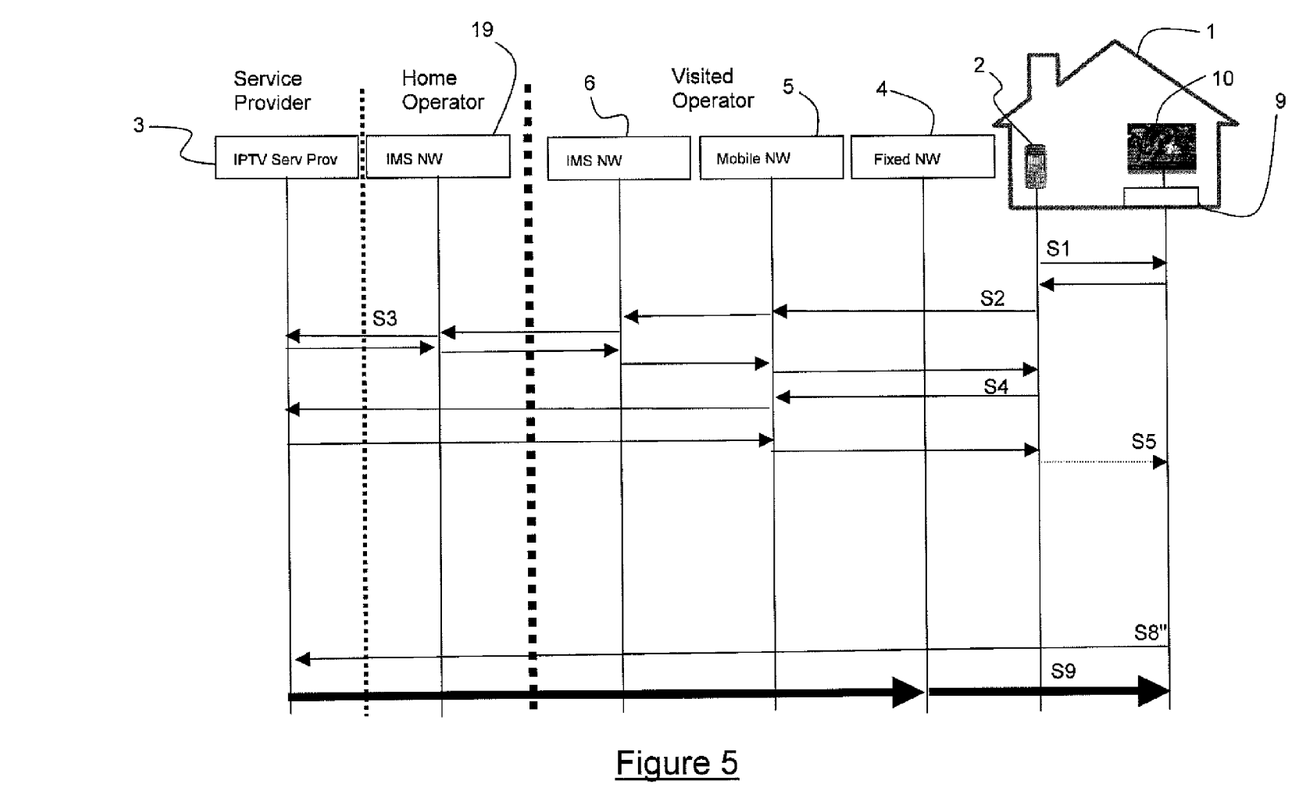
FIG. 5 illustrates a process for remotely ordering delivery of a media stream according to a second embodiment of the invention.

FIG. 5 shows an alternative embodiment of the invention. In this embodiment, once an IPTV service is selected, it is requested in step S8" purely from the STB 9. This may, for example, be carried out using an RTSP DESCRIBE, SET-UP or PLAY message. In this example, it will be noted that no resources are reserved for the IPTV service, and nor are interactivity services coupled with the IPTV service, such as chat and messaging, facilitated.

In a further alternative embodiment (not shown), the STB 9 or TV 10 may also be IMS enabled. If this is the case, then in step 3 of FIG. 4 the MS 2 identifies the IP address and port number of the STB 9 to the IPTV service provider. At step 5, the MS 2 sends a service request message to the IPTV service provider 3, as a result of which the IPTV service provider sends a SIP INVITE message towards the STB 9, and SIP negotiations may be conducted directly between the IPTV service provider 3 and the STB 9 to arrange delivery of the media. However, the user will still be charged via his subscription as the negotiations must follow from the initial authentication to the home IMS network.

In a further embodiment, the MS obtains the RTSP URL of the AS at the IPTV service Provider. This may also be passed to the STB 9. A specific session identity may be handed over to the STB from the MS after the RTSP SETUP has been carried out (i.e. during S5 shown in FIG. 6). This session identity may then be included in the STB RTSP PLAY command sent towards the IPTV service provider.

Figure 6:
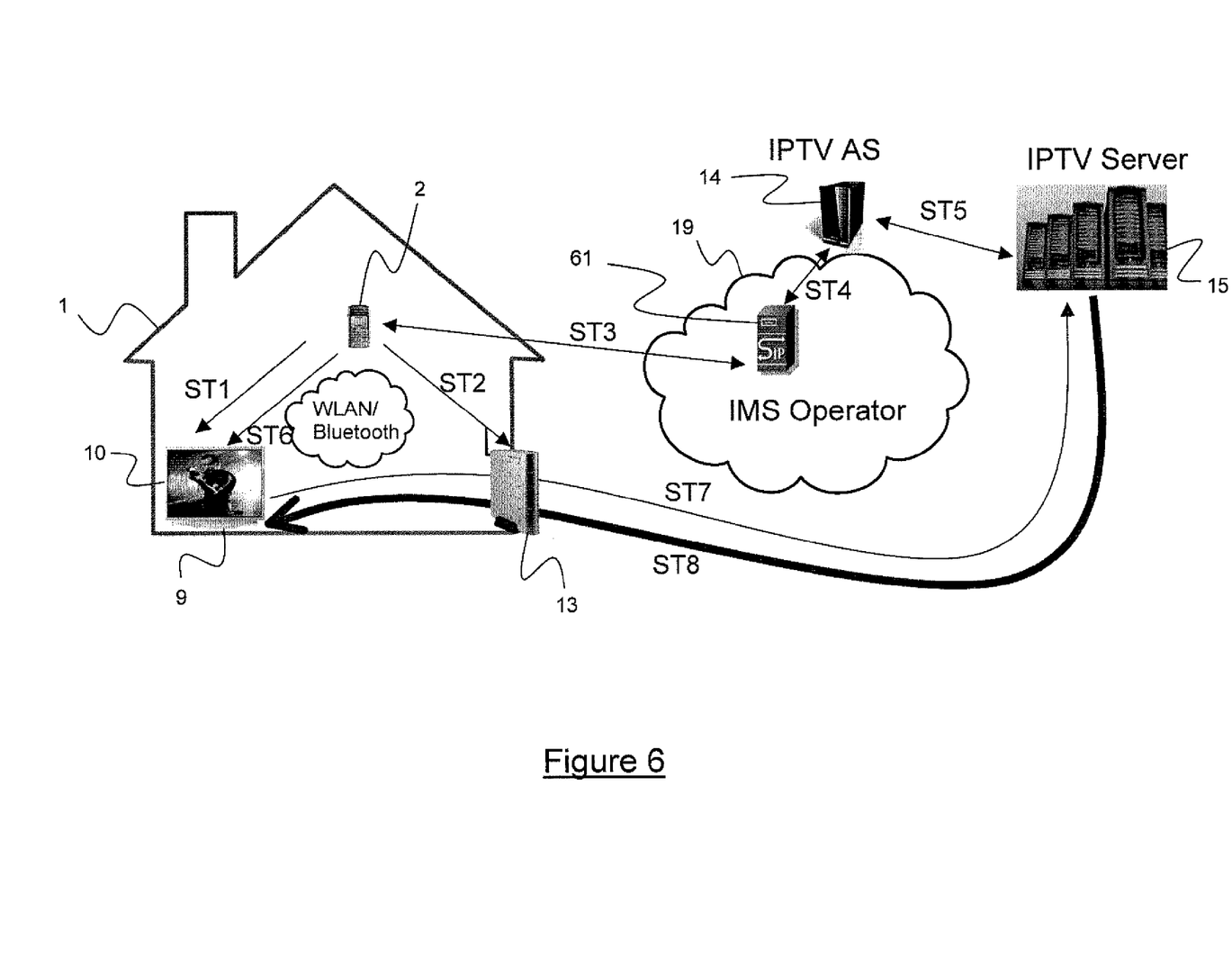
FIG. 6 illustrates a simplified version of the process of FIG. 5.

FIG. 6 illustrates a high-level and simplified arrangement in which an MS 2 contacts an IPTV AS 14 via a proxy 61 in an IMS network 19, in order to order IPTV services. FIG. 6 is a combination of FIG. 4 and FIG. 5 and facilitates all benefits of FIG. 4, but with the addition that the STB issues the final RTSP PLAY message as in FIG. 5. The sequence of events is as follows:

ST1. UPnP: Get IP address & Port number & capability of IPTV STB 9.
ST2. UPnP: Get external IP address & Port number and IPTV address mapping.
ST3. SIP: INVITE (IP address and port number of RGW 13 attached).
ST4. SIP: INVITE (IP address and port number of RGW 13 attached).
ST5. RTSP: DESCRIBE, SET-UP (IP address and port number of RGW 13 attached).
ST6. UPnP/DLNA: "PLAY" Session ID from IPTV Server
ST7. RTSP: PLAY RTSP URL and Session ID from IPTV Server. (Sink IP address/port number are those of RGW 13. These are mapped to IPTV in RGW 13.)
ST8. RTP: Media delivery Thus the present invention enables the user to order the delivery of IPTV to any IP enabled device, since the IMS negotiation and resource reservation to be carried out between the MS and the IPTV service provider. The service can be provided anywhere or at any time. There is no constraint on the uplink of a broadband connection, since the signaling is carried out by the mobile device. The media delivery path compared to previously known solutions is greatly reduced. The home network need not be complex: it simply has to be configured to receive the IPTV services.

Furthermore, the "interactivity" which is one of the key benefits with IMS based IPTV, can be handled via the MS instead of via the IPTV screen (which is the case where an IMS-enabled STB is used). This is true especially if the signaling sequences shown in FIG. 4 and FIG. 6 are followed.

It will be appreciated by the person of skill in the art that various modifications may be made to the above described embodiments without departing from the scope of the present invention. For example, the steps described above show a simple environment, but there is no reason why the invention cannot also be applied to more complex environments involving firewalls and Network Address Translators (NATs). These may be in the home or in the operators' networks.

Furthermore, the above embodiments have been described in the context of a mobile station subscribed to a cellular network and a set top box subscribed to a fixed access network. It will be appreciated that other variants are possible. Indeed, the complexity may be reduced if fewer networks are involved.

In addition, all embodiments have been described with reference specifically to the delivery of IPTV. It will be appreciated that the invention applies equally to all services provided or managed by the operator. Other examples include broadcast TV, gaming and other similar applications.

It will also be appreciated that person-to-person interactivity services, such as chat and messaging, tied to the media delivery and enabled through IMS, may be operated on a device other than the IPTV screen. For example, interactivity services may still be operated via the display screen of the MS.

The invention claimed is:

1. A method of ordering the delivery of a media stream to a second client terminal coupled to an IP network, the method comprising:
    identifying, at a first client terminal, destination address information for the second client terminal, wherein the destination address information includes an IP address and port number of the second client terminal and an IP address and port number of a Residential Gateway through which the second client terminal is coupled to the IP network;
    authenticating the first client terminal to an application server of an IP Multimedia Subsystem network, wherein the authentication of the first client terminal to the application server includes authorizing the second client terminal to the application server;
    sending the destination address information from the first client terminal to the application server;
    delivering the media stream to the second client terminal;
    wherein a RTSP Uniform Resource Locator of the application server is sent to the first client terminal; and
    wherein the RTSP Uniform Resource Locator of the application server is passed from the first client terminal to the second client terminal.

2. The method of claim 1, wherein the authentication of the first client terminal to the application server includes an authentication of a user identity module associated with the first client terminal.

3. The method of claim 1, wherein the authentication of the first client terminal to the application server includes a token identity handshake.

4. The method of claim 1, wherein a session identity is generated in the application server, sent to the first client terminal and passed from there to the second client terminal, and used by the second client terminal to control delivery of the media stream.

5. The method of claim 1, wherein the media stream is delivered to the second client terminal in response to an IMS INVITE message and RTSP PLAY message sent from the first client terminal to the application server.

6. The method of claim 1, wherein the media stream is delivered to the second client terminal in response to an IMS INVITE message sent from the first client terminal and an RTSP PLAY message sent from the second client terminal to the application server.

7. The method of claim 1, wherein the media stream is delivered to the second client terminal in response to a RTSP DESCRIBE, SET-UP and PLAY from the second client terminal to the application server.

8. The method of claim 1, wherein a SIP INVITE message is sent from the application server to the second client terminal in response to a service request sent from the first client terminal to the application server.

9. The method of claim 1, wherein the first client terminal is coupled to the IP network via a cellular access network.

10. The method of claim 1, wherein the second client terminal is coupled to the IP network via a fixed access network.

11. The method of claim 10, wherein a reservation of resources for delivery of the media stream to the second client terminal over the fixed access network is initiated by an IMS message sent from the first client terminal towards the application server.

12. The method of claim 11, wherein the IMS message sent towards the application server is a SIP INVITE message including the destination address information.

13. The method of claim 1, wherein the first client terminal establishes communication with the second client terminal in order to identify the destination address information.

14. The method of claim 13, wherein the communication established between the first client terminal and the second client terminal is established using a local wireless network.

15. The method of claim 1, wherein the media is IPTV media.

16. An application server for use in an IP Multimedia Subsystem to control the delivery of media to client terminals coupled to an IP network, the application server comprising:
 a receiver for receiving, from a first client terminal in the IP Multimedia Subsystem, destination address information for a second client terminal coupled to the IP network, wherein the destination address information includes an IP address and port number of the second client terminal and an IP address and port number of a Residential Gateway through which the second client terminal is coupled to the IP network;
 an authentication circuit for authenticating the first client terminal, and to authorize the second client terminal as a result of the authentication of the first client terminal; and
 a processor and transmitter for arranging delivery of the media from a media source to the second client terminal, wherein a RTSP Uniform Resource Locator of the application server is sent to the second client terminal via the first client terminal.

17. The application server of claim 16, wherein the authentication circuit is arranged to authenticate a user identity module associated with the first client terminal.

18. The application server of claim 16, wherein the authentication circuit is arranged to carry out a token identity handshake.

19. The application server of claim 16, wherein the receiver is arranged to receive a RTSP service request from the first client terminal, and wherein the processor is configured to arrange delivery of the media to the second client terminal in response to the RTSP service request.

20. The application server of claim 16, wherein the processor is configured to send a SIP INVITE message towards the second client terminal in response to a service request received from the first client terminal.

21. The application server of claim 16, wherein the receiver is arranged to receive an RTSP PLAY command from the second client terminal, and wherein the processor is configured to arrange delivery of the media to the second client terminal in response to the RTSP PLAY command.

22. A first client terminal arranged in use to communicate with an application server of an IP Multimedia Subsystem, the first client terminal comprising:
 a receiver configured to:
  receive destination address information from a second client terminal, wherein the destination address information includes an IP address and port number of the second client terminal and an IP address and port number of a Residential Gateway through which the second client terminal is coupled to the IP network; and
  receive a RTSP Uniform Resource Locator of the application server; and
 a transmitter/processor/receiver for sending the destination address information to said application server, authenticating the first client terminal to the application server, authenticating the second client terminal to the application server, instructing the application server to arrange delivery of media to the second client terminal, and passing the RTSP Uniform Resource Locator of the application server to the second client terminal.

23. The terminal of claim 22, further comprising an HTTP interface for communicating with the application server.

24. The terminal of claim 22, further comprising a wireless interface for communicating with the second client terminal.

* * * * *